United States Patent [19]

Trivette, Jr. et al.

[11] 3,919,132

[45] Nov. 11, 1975

[54] ACCELERATOR COMBINATIONS COMPRISING THIOPEROXYDIPHOSPHATE AND BIS (TRIAZINYL) DISULFIDES

[75] Inventors: Chester D. Trivette, Jr.; John P. Vanderkooi, both of Akron; Ralph A. Genetti, Copley, all of Ohio

[73] Assignee: Monsanto Company, St. Louis, Mo.

[22] Filed: Dec. 3, 1973

[21] Appl. No.: 421,125

[52] U.S. Cl. .................. 260/5; 260/79.5 B; 260/791
[51] Int. Cl.² ...................... C08K 5/34; C08J 3/24
[58] Field of Search .................. 260/5, 791, 79.5 B

[56] References Cited
UNITED STATES PATENTS

| 3,419,521 | 12/1968 | Scott et al. | 260/79.5 B |
| 3,629,210 | 12/1971 | Apotheker et al. | 260/5 |
| 3,635,920 | 1/1972 | Apotheker | 260/79.5 B |
| 3,642,727 | 2/1972 | Ashworth et al. | 260/79.5 B |

FOREIGN PATENTS OR APPLICATIONS 1,201,862  8/1970  United Kingdom

*Primary Examiner*—John C. Bleutge
*Attorney, Agent, or Firm*—Richard O. Zerbe

[57] ABSTRACT

Vulcanizable compositions and processes for vulcanizing rubber are disclosed comprising accelerator systems comprising mixtures of thioperoxydiphosphate and bis(triazinyl)disulfides.

8 Claims, No Drawings

ACCELERATOR COMBINATIONS COMPRISING THIOPEROXYDIPHOSPHATE AND BIS (TRIAZINYL) DISULFIDES

This invention relates to improved vulcanizable natural rubber compositions and to improved methods for vulcanization of natural rubber which comprises vulcanization systems comprising accelerator combinations comprising thioperoxydiphosphate and bis(amino-s-triazinyl)disulfides.

BACKGROUND OF THE INVENTION

Known accelerators belong to the class of organic disulfide accelerators, examples of different types of disulfide accelerators are thiazole disulfides, thiuram disulfides, thioperoxydiphosphates and diamino-s-triazinyl disulfides. The first two members of this series are potent accelerators alone and because of their powerful accelerating activity they are sometimes used with classes of other accelerators to activate the cure. Contrasted with the first two members of the series, the last two members exhibit considerably less accelerator activity, meaning, that they are slower curing and less efficient. Because of the lower cure rate exhibited by the latter types of disulfide accelerators, generally they are used in combination with one or both of the first mentioned disulfide accelerators or with other classes of accelerators to achieve adequate rates of cure. For example, Scott and Williams, U.S. Pat. No. 3,419,521 issued Dec. 31, 1968 discloses that the use of thioperoxydiphosphates in combination with other classes of accelerators reduces the cure time and the scorch tendency of the vulcanizable composition. Combinations of bis(diamino-s-triazinyl)disulfides, thiazole disulfides and thiuram disulfides are commercially available.

SUMMARY OF THE INVENTION

It has now been discovered that sulfur vulcanizable diene rubber compositions the major proportion of the rubber being natural rubber having incorporated therein sulfur and a combination of thioperoxydiphosphate accelerator and bis(diamino-s-triazinyl)disulfide accelerator exhibits synergism in respect to higher modulus and tensile strength and higher heat stability compared to sulfur vulcanizates prepared from either accelerator in same amount or either accelerator mixed with other disulfide accelerators. It is indeed surprising that two relatively weaker disulfide accelerators when used together result in unexpectedly improved vulcanizate properties.

The synergistic accelerator combination of this invention comprises two components A and B. Component A comprises a known class of thioperoxydiphosphate accelerators such as described in the aforesaid U.S. Pat. No. 3,419,521; supra, and Component B comprises a known class of bis(amino-s-triazinyl)disulfides such as described in British Pat. No. 1,201,862, which disclosures are incorporated herein by reference. The amount of each component may vary from 10 parts by weight of one component and 90 parts by weight of the other component per 100 parts accelerator combination and synergism is observed. Sometimes, the combination comprises about 30 parts by weight of one component and about 70 parts by weight of the other component but more often combinations comprising equal amounts of each component are used. When disproportionate amounts of each component are used, preferably thioperoxydiphosphate is the major component.

Known thioperoxydiphosphate accelerators may be characterized by the formula

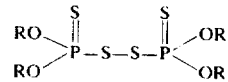

in which each R independently is alkyl, cycloalkyl, aryl or aralkyl. The number of carbon atoms of the R groups is a matter of choice but disulfides having ten carbon atoms or less in each R group are recommended since larger R groups tend to merely dilute the accelerator effect of the thiophosphoryl disulfide moiety which contributes substantially to the accelerating function. Thus, in a preferred group of thioperoxydiphosphates the number of carbon atoms in each R group does not exceed ten. Straight or branched alkyl radicals of 1–10 carbon atoms represent a satisfactory subgroup with lower alkyl radicals of 1–5 carbon atoms being preferred. Illustrative alkyl radicals are methyl, ethyl, propyl, isopropyl, n-butyl, isobutyl, sec-butyl, tert-butyl, pentyl, hexyl, 1-methylhexyl, and octyl. Aralkyl radicals of 7–10 carbon atoms represent a suitable subgroup with benzyl being preferred. Illustrative examples of aralkyl radicals are α-methylbenzyl, α,α-dimethylbenzyl, phenethyl, xylyl, phenylpropyl and phenylbutyl. Straight or branched cycloalkyl radicals of 5–10 carbon atoms represent a satisfactory subgroup with cyclohexyl being preferred. Illustrative examples of cycloalkyl radicals are cyclopentyl, 2-methylcyclohexyl, 4-methylcyclohexyl, cycloheptyl, cyclooctyl and cyclodecyl. Aryl radicals of 6–10 carbon atoms represent a satisfactory subgroup with phenyl being preferred. Illustrative aryl examples are tolyl, 4-butylphenyl and napthyl.

Known bis(diamino-s-triazinyl)disulfide accelerators may be characterized by the formula

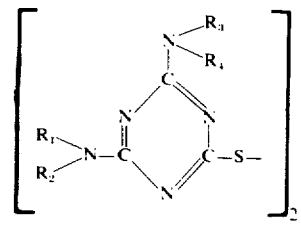

in which $R_1$ and $R_3$ are hydrogen, alkyl, alkenyl, cycloalkyl, aralkyl or aryl or said radicals may be substituted by cyano, hydroxy or lower alkoxy; and $R_2$ and $R_4$ are alkyl, alkenyl, cycloalkyl, aralkyl or aryl or said radicals may be substituted by cyano, hydroxy or lower alkoxy. $R_1$ and $R_2$; and $R_3$ and $R_4$, respectively, together with the nitrogen atoms to which they are attached may form a heterocyclic ring. $R_1$ and $R_2$, or $R_3$ and $R_4$ may be joined to each other through carbon forming a mono- or bi-cyclic alkylene radical or may be joined to each other through oxygen or sulfur forming a single divalent radical attached to nitrogen comprising two alkylene radicals joined by oxygen or sulfur. The number of carbon atoms attached to the nitrogen is immaterial but lower molecular weight compounds are recommended. The range of carbon atoms of the representative subgroups of the alkyl, aralkyl, cycloalkyl and aryl radicals and the illustrative examples of said radicals described in regard to the thioperoxydiphosphate accelerators are equally applicable to the triazinyl disulfide accelerators. Alkenyl radicals of 3–8 carbon atoms represent a satisfactory subgroup with allyl being preferred. Illustrative alkenyl radicals are 2-butenyl, 3-butenyl, isobutylene, 2-pentenyl, 3-hexenyl and 2-methyl-2-pentenyl. Hydroxy substituted alkyl radicals of 1–5 carbon atoms are preferred, examples of which are hydroxymethyl, 2-hydroxyethyl, 2-hydroxypropyl, 3-hydroxy-2-propyl, 4-hydroxybutyl and 3-hydroxypentyl. Alkoxy substituted alkyl radicals of 1–5 carbon atoms are preferred, examples of which are methoxymethyl, 2-methoxyethyl, 3-methoxypropyl, 2-ethoxyethyl, and 4-methoxybutyl.

Heterocyclicamino radicals of 4–8 carbon atoms are preferred. Examples of such radicals are pyrrolidinyl, 2,5-dimethylpyrrolidinyl, piperidino, 4-methylpiperidino, morpholino, thiomorpholino, 2,6-dimethylmorpholino, hexahydro-1H-azepin-1-yl and azabicyclo(3.2.2)non-3-yl.

Examples of thioperoxydiphosphates are 0,0'-dimethyl thioperoxydiphosphate, 0,0'-diethyl thioperoxydiphosphate, 0,0'-dipropyl thioperoxydiphosphate, 0,0'-di-n-butyl thioperoxydiphosphate, 0,0'-dicyclohexyl thioperoxydiphosphate, 0,0'-dibenzyl thioperoxydiphosphate, 0,0'-diphenyl thioperoxydiphosphate and 0,0'-diisobutyl thioperoxydiphosphate.

Examples of bis(diamino-s-triazinyl)disulfides are
bis(di-2,4-dimethylamino-s-triazin-6-yl)disulfide
bis(di-2,4-diethylamino-s-triazin-6-yl)disulfide
bis(di-2,4-dipropylamino-s-triazin-6-yl)disulfide
bis(di-2,4-diisopropylamino-s-triazin-6-yl)disulfide
bis(di-2,4-di-n-butylamino-s-triazin-6-yl)disulfide
bis(di-2,4-diisobutylamino-s-triazin-6-yl)disulfide
bis(di-2,4-diallylamino-s-triazin-6-yl)disulfide
bis(di-2,4-methylamino-s-triazin-6-yl)disulfide
bis(di-2,4-ethylamino-s-triazin-6-yl)disulfide
bis(di-2,4-propylamino-s-triazin-6-yl)disulfide
bis(di-2,4-isopropylamino-s-triazin-6-yl)disulfide
bis(di-2,4-n-butylamino-s-triazin-6-yl)disulfide
bis(di-2,4-benzylamino-s-triazin-6-yl)disulfide
bis(2-methylamino-4-dimethylamino-s-triazin-6-yl)disulfide
bis(2-ethylamino-4-diethylamino-s-triazin-6-yl)disulfide
bis(2-propylamino-4-dipropylamino-s-triazin-6-yl)disulfide
bis(2-isopropylamino-4-diisopropylamino-s-triazin-6-yl)disulfide
bis(2-methylamino-4-diethylamino-s-triazin-6-yl)disulfide
bis(2-methylamino-4-dipropylamino-s-triazin-6-yl)disulfide
bis(2-ethylamino-4-dimethylamino-s-triazin-6-yl)disulfide
bis(2-ethylamino-4-dipropylamino-s-triazin-6-yl)disulfide
bis(2-cyclohexylamino-4-dicyclohexylamino-s-triazin-6-yl)disulfide
bis(2-benzylamino-4-dibenzylamino-s-triazin-6-yl)disulfide
bis(2-morpholino-4-ethylamino-s-triazin-6-yl)disulfide
bis(2,4-dimorpholino-s-triazin-6-yl)disulfide
bis(2,4-dipiperidino-s-triazin-6-yl)disulfide and
bis(2-piperidino-4-ethylamino-s-triazin-6-yl) disulfide.

The accelerator combinations of this invention are incorporated into the rubber by conventional techniques either by addition to an internal mixer, such as a Banbury mixer, or they may be added to the rubber on a mill. The accelerators may be added individually or may be added as a premixed blend. The fully compounded stocks are then heated to effect vulcanization. The amount of accelerator combination added varies depending upon the properties desired in the vulcanizate but generally the amount is between 0.2–6.0 parts by weight per 100 parts by weight of rubber with 0.5–2.0 parts by weight per 100 parts by weight of rubber being the amount commonly used.

The rubber stocks may include conventional compounding ingredients such as sulfur, carbon black, zinc oxide, reinforcing silica, stearic acid, extender oil, phenolic antidegradant, phenylenediamine antidegradant, tackifier, scorch inhibitor and bonding agent and may also include conventional accelerators. Sulfur, the vulcanizing agent, is added in the usual quantities with the amount varying depending upon the properties desired, generally the amount used is between about 1–4 parts per 100 parts rubber.

The synergistic effects of the accelerator combinations of this invention are realized in any sulfur vulcanizable diene rubber the major proportion of which is natural rubber. Examples of synthetic diene rubbers which are suitable for mixing with natural rubber include cis-4-polybutadiene, butyl rubber, ethylene-propylene terpolymers, polymers of 1,3-butadiene, polymers of isoprene, copolymers of 1,3-butadiene with other monomers, for example, styrene, acrylonitrile, isobutylene, and methylmethacrylate.

For the rubber stocks tested and described herein as illustrative of the invention, Mooney scorch times at the designated temperatures are determined by means of a Mooney plastometer. The time in minutes required for the Mooney reading to rise five points above the minimum viscosity is recorded. Longer times on the Mooney scorch test are desirable because this indicates greater processing safety. Cure characteristics are determined at the designated temperatures by means of the Monsanto Oscillating Disk Rheometer which is described by Decker, Wise and Guerry in Rubber World, December 1962, page 68. From the Rheometer data, the maximum torque, R max., in Rheometer units is recorded. The increase in torque is a measure of the degree of vulcanization and is proportional to the crosslink density. Heat stability is evaluated by reversion data using the Rheometer. The loss in torque after ten minutes heating at the indicated temperature beyond the time required to reach maximum torque is measured and recorded. Low torque loss indicates high heat stability. The time, $t_2$ in minutes for a rise of two Rheometer units above the minimum reading, and the time, $t_{90}$, required to obtain a torque of 90 percent of the maximum is recorded. The difference, $t_{90}-t_2$, is a measure of the cure rate of the sample. Vulcanizates are prepared by press curing at the selected temperature for the time indicated by the Rheometer data to obtain optimum cure. The physical properties of the vulcanizates are measured by conventional methods.

DESCRIPTION OF PREFERRED EMBODIMENTS

The following tables illustrate the use of the accelerator combinations of this invention in the vulcanization of natural rubber and natural rubber synthetic rubber blends. Rubber masterbatches are prepared by mixing the ingredients shown below in standard rubber mixing equipment. All parts are by weight. Santoflex 13 is N-

(1,3-dimethylbutyl)-N'-phenyl-p-phenylenediamine. Vulcanizable compositions are prepared by adding sulfur, thioperoxydiphosphate accelerator and bis(-diamino-s-triazinyl)-disulfide accelerator. The properties of the vulcanizable compositions and of the vulcanizates are determined as previously described.

and 6 are stocks of this invention which demonstrate the surprising synergistic effect of the accelerator mixture. The data show that upon vulcanization the stocks containing the accelerator combination exhibit a significantly higher cross-link density as shown by the maximum torque and modulus values. In addition to the

TABLE I

| Ingredient | Masterbatch Parts by Weight |
|---|---|
| Natural rubber | 100.0 |
| Zinc Oxide | 3.0 |
| Stearic acid | 2.0 |
| ISAF carbon black | 45.0 |
| Hydrocarbon softener | 5.0 |
| Santoflex 13 | 2.0 |
| TOTAL | 157.0 |

| | 1 | 2 | 3 | 4 | 5 | 6 |
|---|---|---|---|---|---|---|
| Masterbatch | 157.0 | | | | | |
| Sulfur | 2.0 | 2.0 | 2.0 | 1.0 | 1.0 | 1.0 |
| O,O'-diisopropyl thioperoxydiphosphate | 0.5 | — | 0.25 | 1.0 | — | 0.5 |
| Bis(2-ethylamino-4-diethylamino-s-triazin-6-yl)disulfide | — | 0.5 | 0.25 | — | 1.0 | 0.5 |
| Mooney Scorch at 250°F | | | | | | |
| t₅ | 34.5 | 29.4 | 26.0 | 44.1 | 38.4 | 32.1 |
| Rheometer data at 292°F | | | | | | |
| t₉₀-t₂ | 18.6 | 21.4 | 14.2 | 11.1 | 13.9 | 19.9 |
| R max. | 51 | 63 | 79 | 43 | 60 | 83 |
| Rheometer data at 328°F | | | | | | |
| R max. | 44 | 56 | 61 | 41 | 49 | 67 |
| Reversion, (in.-lb. after 10 min.) | 3.8 | 3.9 | 1.5 | 1.4 | 0.3 | 0.1 |
| Stress-Strain data at 292°F | | | | | | |
| Cure time, minutes | 50 | 50 | 35 | 35 | 40 | 65 |
| 300% modulus, psi | 1130 | 1590 | 1880 | 1080 | 1560 | 2310 |
| Ult. Tensile, psi | 3400 | 3770 | 4140 | 3400 | 4120 | 4320 |

Stocks 1 and 4 are control stocks showing the accelerating activity of thioperoxydiphosphate alone at two different sulfur/accelerator ratios. Similarly, Stocks 2 and 5 are control stocks showing the accelerating activity of bis(diamino-s-triazinyl)disulfide alone. Stocks 3 high state of cure, the vulcanizates are more stable at high temperature as demonstrated by the low reversion values. Similar improvements are obtained with combinations of other thioperoxydiphosphates and bis(-diamino-s-triazinyl)disulfides.

TABLE II

| | Masterbatch A | Masterbatch B |
|---|---|---|
| Natural rubber | 100.0 | 70.0 |
| Cis-4-polybutadiene rubber | — | 30.0 |
| HAF black | — | 50.0 |
| ISAF black | 55.0 | — |
| Zinc oxide | 5.0 | 5.0 |
| Stearic acid | 3.0 | 2.0 |
| Santoflex 13 | 2.0 | 2.0 |
| Hydrocarbon processing aids | 5.0 | 6.5 |
| Silica | 15.0 | — |
| Pine tar | — | 5.0 |
| TOTAL | 185.0 | 172.0 |

| | 1 | 2 | 3 | 4 | 5 | 6 |
|---|---|---|---|---|---|---|
| Masterbatch A | 185.0 | 185.0 | — | — | — | — |
| Masterbatch B | — | — | 172.0 | 172.0 | 172.0 | 172.0 |
| Sulfur | 1.43 | 1.0 | 1.5 | 1.06 | 1.06 | 1.06 |
| Bis(2-ethylamino-4-diethylamino-s-triazin-6-yl)disulfide | 1.43 | 0.5 | 1.5 | 0.53 | 0.35 | 0.26 |
| O,O'-diisopropyl thioperoxydiphosphate | — | 0.5 | — | 0.53 | 0.71 | 0.80 |
| Mooney Scorch at 250°F | | | | | | |
| t₅, minutes | 35.8 | 25.7 | 33.5 | 33.5 | 31.8 | 32.9 |
| Rheometer data at 292°F | | | | | | |
| t₉₀-t₂ | 10.7 | 14.3 | 9.1 | 12.1 | 13.8 | 15.3 |
| R. max | 73 | 78 | 60.4 | 62.0 | 61.9 | 61.0 |
| Rheometer data at 328°F | | | | | | |
| R. max | 73.2 | 72.3 | 62.4 | 60.0 | 59.4 | 58.6 |
| Reversion, (in.-lb. after 10 min.) | 0.9 | 0.8 | 2.4 | 0.8 | 0.4 | 0.5 |
| Stress-Strain at 292°F | | | | | | |
| Cure time, minutes | 55 | 55 | 30 | 35 | 40 | 40 |
| 300% modulus, psi | 2350 | 2610 | 1370 | 1470 | 1430 | 1430 |

TABLE II-continued

| | Masterbatch A | | | Masterbatch B | | |
|---|---|---|---|---|---|---|
| Ult. tensile, psi | 3780 | 3800 | 3000 | 3080 | 3120 | 3130 |

The data of Table II indicate that the amount of both sulfur and accelerator can be substantially reduced by the use of the synergistic accelerator combinations of this invention and essentially the same state of cure or better is achieved.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. Sulfur vulcanizable diene rubber composition the major proportion of the rubber being natural rubber having incorporated therein sulfur and an accelerating amount of a synergistic accelerator combination of thioperoxydiphosphate accelerator of the formula

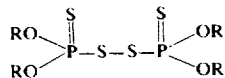

in which R is alkyl of 1–10 carbon atoms and bis(-diamino-s-triazinyl)disulfide accelerator of the formula

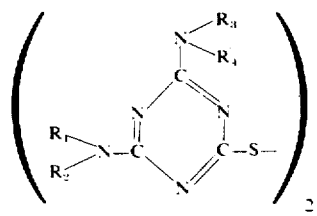

in which $R_1$ and $R_3$ are hydrogen or the same as $R_2$ and $R_4$, $R_2$ and $R_4$ independently are alkyl of 1–10 carbon atoms.

2. The composition of claim 1 in which the accelerator combination is in the amount of about 0.5–2.0 parts by weight per 100 parts by weight rubber and the amount of each thioperoxydiphosphate and bis (diamino-s-triazinyl)disulfide is between about 30–70 parts per 100 parts accelerator combination.

3. The composition of claim 2 in which $R_1$ and $R_3$ are hydrogen or lower alkyl and R, $R_2$ and $R_4$ are lower alkyl.

4. The composition of claim 3 in which each R is isopropyl, $R_1$ is hydrogen and $R_2$, $R_3$ and $R_4$ are ethyl.

5. A process for vulcanizing rubber which comprises incorporating into sulfur vulcanizable diene rubber composition the major proportion of the rubber being natural rubber, sulfur and, in amount effective to accelerate vulcanization, a synergistic accelerator combination of thioperoxydiphosphate accelerator of the formula

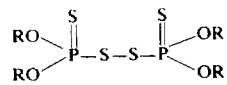

in which R is alkyl of 1– carbon atoms and bis (diamino-s-triazinyl) disulfide accelerator of the formula

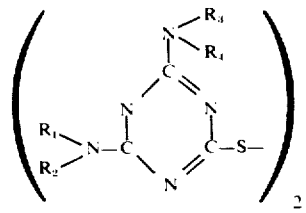

in which $R_1$ and $R_3$ are hydrogen or the same as $R_2$ and $R_4$, $R_2$ and $R_4$ independently are alkyl of 1–10 carbon atoms and heating to effect vulcanization.

6. The process of claim 5 in which the accelerator combination is incorporated in the amount of about 0.5–2.0 parts by weight per 100 parts by weight rubber and the amount of each thioperoxydiphosphate and bis (diamino-s-triazinyl)disulfide is between about 30–70 parts per 100 parts accelerator combination.

7. The process of claim 6 in which $R_1$ and $R_3$ are hydrogen or lower alkyl and R, $R_2$ and $R_4$ are lower alkyl.

8. The process of claim 7 in which each R is isopropyl, $R_1$ is hydrogen and $R_2$, $R_3$ and $R_4$ are ethyl.

* * * * *